Patented Feb. 29, 1944

2,343,215

UNITED STATES PATENT OFFICE 2,343,215

PRODUCTION OF RESINLIKE SUBSTANCES

Eduard Färber, New Haven, Conn., assignor to Polyxor Chemical Co., Inc., New Haven, Conn., a corporation of New Jersey No Drawing. Application May 31, 1940, Serial No. 338,048

3 Claims. (Cl. 260—9)

My invention relates to resin-like substances and their production from certain materials, and especially to the production of such substances from the residues which result from the chemical treatments of plant products initially containing cellulose by which the pentosans are removed while the lignin remains.

The manufacture of furfural is an example of such treatments. Materials rich in pentosans like oat hulls or bagasse, and the different kinds of straws, stalks or hulls of wild growing or cultivated plants can serve as the raw materials for the production of furfural. The furfural producing treatment usually consists in heating these materials in the presence of mineral acids and live steam. From twenty to thirty percent of the plant substance is thereby transformed chemically, leaving behind the residue which up to the present time has been considered worthless except as a fuel of low value.

I have discovered that these residues can yield resins of high technical value, and also means whereby such resins can be obtained from these residues. Further the structure of these wastes, which make them unsuitable for the recovery of their cellulose contents, is of advantage because it permits the reagents to penetrate them quickly and thoroughly.

Briefly, I have discovered that at sufficiently high temperatures plant bodies initially containing cellulose that have been subjected to operations of the kind indicated will react with abietic acid, for instance in the form of rosin, oleic acids, and in general the acids of those mixtures of fatty and resin acids which constitute tall oil. It is immaterial, however, whether the acid or acids be obtained from or used in the form of rosin or tall oil, or otherwise. It is immaterial also whether the acidic material be in the form of free acid or in that of lactone or a polymerized product. Mixtures can be used. In many cases, no catalyst is required when these acids are used but the reaction should be carried on at rather high temperatures; however, some mineral acid may be necessary to neutralize basic mineral substances contained in the plant material.

Water is formed by the reaction and water must be removed from the reacting mixture in some suitable way. This can be done by allowing the escape of the water vapor evolved at the elevated temperature which I use to bring about the reaction.

I prefer to take the plant material in a rather dry state, for instance, air dried or containing less than 10% of water. At least one part of acid in the case of the described wood acids to one part of the plant material after the prior operation (e. g., pentosan extraction operation), all by weight is generally used for the reaction. However, an excess of acid over this amount is advantageous generally. Although the surplus does not enter always into the reaction, it acts as a solvent for the resin during its formation, facilitates the penetration into the mass of the heat necessary for the reaction, and may compensate for any loss of acid during the process; any surplus acid remaining at the end of the reaction can be separated from the resinous material in various ways, say by distillation, under reduced pressure if desired or necessary, or by extraction with solvents of the acids which do not attack the resin. The excess acid may equal as much as the quantity of acid entering into the reaction, or even be greater than this. However, one and a half parts of tall oil can be used to one part of the plant bodies, by weight. A rather high temperature is necessary to bring about the reaction. In general at atmospheric pressure, it is necessary to heat the mass to over 200° and up to 350°. Once the mixture reaches a temperature of 200° the reaction proceeds well and is finished at over 300° in less than two hours.

The mixture which is nearly dry in the beginning, melts with slow evolution of vapors, containing water, small amounts of aldehydes and oils, parts of which, especially in the first phases of the reaction, are acidic, while other parts, especially those distilling towards the end of the heating period, are essentially neutral and contain hydro-carbons. Because of the viscosity of the reaction-mixture, care should be taken to assure rapid escape of gases and vapors and good heat transfer. For example, an excess of the acid can be used in order to facilitate the heat transfer, and good contact with the source of heat, such as metal surfaces, can be obtained by agitation.

I may take one hundred parts of bagasse or oat hulls from which most of the pentosan has been removed by, say, heating with dilute mineral acids, and excess water removed by heating for example, and mix this with two hundred parts of abietic or other rosin acids or the mixture of acids contained in tall oil. I then apply heat to this mixture so that the temperature rises gradually, say within one hour, to 250° C. and continue heating for another hour with gradual rise of the temperature up to 330° C. until the reaction is completed and the surplus of oil distilled off. Ordinarily no catalyst is necessary.

The vapors driven off during the reaction and distillation carry with them the water of reaction. With these temperatures, the reaction can be finished at atmospheric pressure, although it may be advantageous to facilitate the removal of volatile substances by reducing it towards the end of the reaction period or by introducing inert gases. The resinous material thus obtained is a solid substance at room temperature, and can be used for coating metals, paper and other substances, for molding articles with or without the additional use of fillers, plasticizers or other resins. If desired, however, it can be separated into a softer fraction which is soluble in a wide variety of liquids and a harder fraction soluble in a limited choice of liquids, by treatment with, for example, isopropyl alcohol until no more of the resinous material dissolves; heating this resin-alcohol mixture to the boiling point of the solution facilitates the operation considerably. The harder resin fraction can then be separated by filtration or settling, and the softer fraction recovered from its solution if necessary. The relative amounts of the two fractions depend on the length of heating of the reaction mass, generally speaking; in general, the yield of the harder fraction is increased by lengthening the period of heating. For an optimum yield of the harder fraction, the heating period can be extended beyond the disappearance of the solid particles of the plant material. The softer fraction can be used in paint and varnishes, the harder for the same purposes or for molding articles.

These resins have high technical value for coating or molding because of their chemical stability.

It will be understood, of course, that my invention is not limited to the details mentioned above except as appears hereinafter in the claims.

I claim:

1. The method of manufacturing a fusible resin-like substance soluble in certain organic liquids, which consists in producing a reaction between plant bodies initially containing cellulose from which pentosan has been removed and at least one material selected from the group consisting of the resin acids of the kind that are found in tall oil and mixtures of such acids and the fatty acids of the kind that are found in tall oil, the quantity of the material selected from said group being, by weight, not less than about one part of acid to one part of plant material, by heating a mixture thereof to a temperature of at least about 300° C.

2. The subject matter of claim 1, characterized by the fact that the plant bodies are the residue of the manufacture of furfural from oat hulls.

3. The method of manufacturing a fusible resin-like substance soluble in certain organic liquids, which consists in producing a reaction between plant bodies initially containing cellulose from which pentosan has been removed and the mixture of wood acids known as tall oil, by heating a mixture thereof to not exceeding about 350° C., there being, by weight, one and a half parts of tall oil to one part of the plant bodies.

EDUARD FÄRBER.